United States Patent
Kim

(10) Patent No.: US 7,672,052 B2
(45) Date of Patent: Mar. 2, 2010

(54) OPTICAL SHEET AND METHOD OF ASSEMBLING LIQUID CRYSTAL DISPLAY MODULE USING THE SAME

(75) Inventor: Young Su Kim, Kyoungsangbuk-Do (KR)

(73) Assignee: LG Display Co., Ltd., Seoul (KR)

( * ) Notice: Subject to any disclaimer, the term of this patent is extended or adjusted under 35 U.S.C. 154(b) by 155 days.

(21) Appl. No.: 11/534,947

(22) Filed: Sep. 25, 2006

(65) Prior Publication Data

US 2007/0019437 A1    Jan. 25, 2007

Related U.S. Application Data

(62) Division of application No. 10/322,729, filed on Dec. 19, 2002, now Pat. No. 7,130,008.

(30) Foreign Application Priority Data

Feb. 2, 2002    (KR)    .................... 10-2002-0006046

(51) Int. Cl.
  *G02B 5/04*    (2006.01)
(52) U.S. Cl. .................. 359/599; 362/607; 362/620; 349/64
(58) Field of Classification Search ......... 362/603, 362/606, 607, 617, 618, 619, 620; 359/599; 349/61, 62, 64; 428/1.1
  See application file for complete search history.

(56) References Cited

U.S. PATENT DOCUMENTS

| 4,592,623 | A | 6/1986 | Yamamoto et al. |
| 6,016,175 | A | 1/2000 | Kim |
| 6,512,562 | B1 | 1/2003 | Kobayashi et al. |
| 6,654,085 | B1 | 11/2003 | Koike et al. |
| 6,917,396 | B2 * | 7/2005 | Hiraishi et al. ............... 349/64 |
| 7,268,770 | B1 * | 9/2007 | Takahata et al. ........... 345/173 |
| 2003/0021025 | A1 | 1/2003 | Saiki et al. |

FOREIGN PATENT DOCUMENTS

JP    05313165 A    11/1993

* cited by examiner

*Primary Examiner*—Thomas M Sember
(74) *Attorney, Agent, or Firm*—Birch, Stewart, Kolasch & Birch, LLP

(57) ABSTRACT

The present invention relates to an optical sheet and a method of assembling a liquid crystal display module that is capable of preventing an inflow of impurities on a backlight unit, thereby minimizing screen staining caused by the impurities. An optical sheet installed between a liquid crystal display panel and a light guide member according to the present invention includes a transparent peeling sheet adhered to the front surface of the optical sheet facing the liquid crystal display panel; and a semitransparent peeling sheet stuck to the rear surface of the optical sheet facing the light guide member.

3 Claims, 3 Drawing Sheets

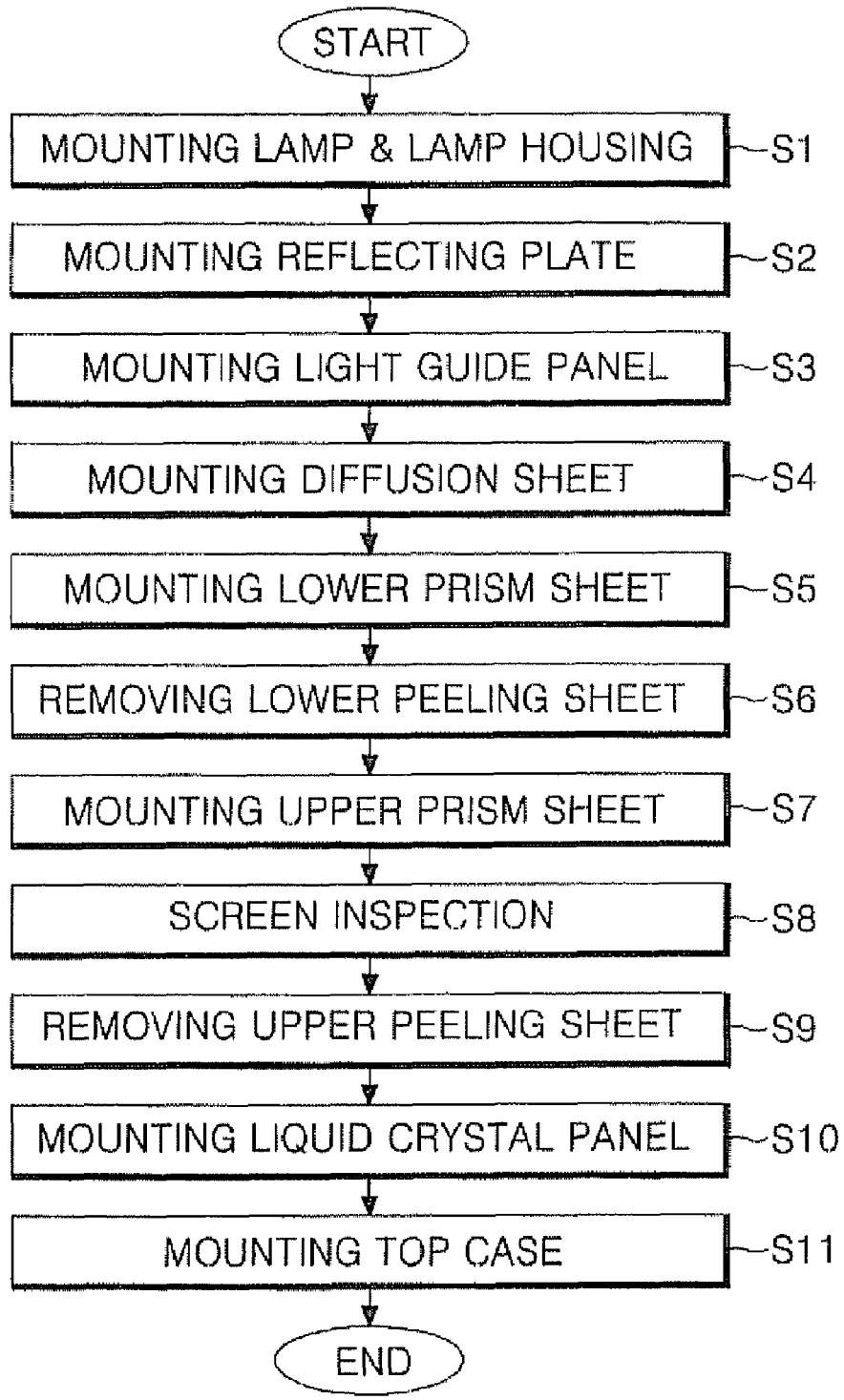

OPTICAL SHEET AND METHOD OF ASSEMBLING LIQUID CRYSTAL DISPLAY MODULE USING THE SAME

This application is a Divisional of application Ser. No. 10/322,729 filed on Dec. 19, 2002, now U.S. Pat. No. 7,130,008, which claims priority under 35 U.S.C. § 119(a) of Patent Application No. P2002-6046 filed in Korea on Feb. 2, 2002, the entire contents of which are hereby incorporated by reference for which priority is claimed under 35 U.S.C. § 120.

BACKGROUND OF THE INVENTION

1. Field of the Invention

This invention relates to a liquid crystal display module, and more particularly to an optical sheet and a method of assembling a liquid crystal display module that is capable of preventing an inflow of impurities on a backlight unit, thereby minimizing screen staining caused by the impurities.

2. Description of the Background Art

Generally, a notebook personal computer NTPC is manufactured in a notebook size to enable a user to access information during the course of the movement. A liquid crystal module LCM is used as a display device for displaying information in the NTPC.

The LCM includes a liquid crystal display panel and a driving circuit part for driving the liquid crystal display panel. The liquid crystal display panel includes liquid crystal cells arranged in matrix form between two glass substrates and switching devices for switching a signal supplied to these liquid crystal cells. Because the LCM includes glass substrates which can be easily damaged by an external impact, a case is used to protect the outer part of the LCD in order to prevent such damage.

Referring to FIG. 1, a conventional LCM includes a support main 14, a liquid crystal display panel 2 deposited on the support main 14, a top case 10 covering the edge of the liquid crystal display panel 2 and the support main 14, and a backlight unit having a plurality of optical sheets 32, 34, 36 and a light guide panel 24.

In the liquid crystal display panel 2, a liquid crystal is interposed between two glass substrates to which an upper and a lower polarizing plate 42, 40 are adhered respectively, and a thin film transistor TFT drives each of liquid crystal cells (arranged in matrix form).

The top case 10 is bent at a right angle to cover the side surface of the support main 14 and the edge of the liquid crystal display panel 2. The support main 14 and the top case 10 are assembled with screws (not shown).

The support main 14 is generally made as a molding, but has recently been manufactured of a metal such as aluminum Al, which has excellent heatproof against high temperature, in correspondence to a high brightness television or a high brightness monitor. A reflecting plate 26 is located at the bottom of the support main 14, and the light guide panel 24 and the optical sheets 32, 34, 36 are deposited on top of it. The liquid crystal display panel 2 is mounted on the optical sheets 32, 34, 36 in the support main 14.

The back light unit includes a lamp 2O for generating light, a lamp housing 16 shaped to adequately cover the lamp 20, a light guide panel 24 for converting the incident light from the lamp 20 to the planar light source, a reflecting plate 26 installed at the rear of the light guide plate 24, and optical sheets on which a diffusion sheet 32, a lower prism sheet 34 and an upper prism sheet 36 are sequentially deposited.

A cold cathode fluorescent lamp CCFL is mainly used as the lamp 20, and the light generated at the lamp 20 is incident to the light guide panel 24 through an incident surface located at the side surface of the light guide panel 24.

The lamp housing 16 has a reflecting surface on the inside of it to reflect the light from the lamp 20 to the incident surface of the light guide panel 24. The light guide panel 24 is manufactured in the shape of its rear surface (being inclined) and its front surface (being flat). The reflecting plate 26 reflects the light incident to itself from the rear surface of the light guide panel 24 to the light guide panel 24, thereby reducing the loss of light. That is, if the light from the lamp 20 is incident to the light guide panel 24, it is reflected in a tilt angle at the rear surface (being the inclined surface) to progress toward the front surface uniformly. At this moment, the light progressed to the lower surface and the side surface of the light guide panel 24 is reflected at the reflecting plate 26 to progress toward the front surface. The light passing through the light guide panel 24 is diffused to an entire area by the diffusion sheet 32.

On the other hand, the light incident to the liquid crystal display panel 2 has higher light efficiency when it is incident perpendicularly. For this cause, it is desirable to deposit two forward direction prism sheets to cause the progression angle of the light coming out of the light guide panel 24 to be perpendicular to the liquid crystal display panel. The light passing through the diffusion sheet 32 is incident to the liquid crystal display panel 2 via the lower and the upper prism sheets 34, 36.

In a method of assembling such a LCM, the reflecting plate 26 is mounted on the bottom surface of the support main 14, the light guide panel 24 is then mounted on the reflecting plate 26, the backlight unit including the diffusion sheet 32, the lower prism sheet 34 and the upper prism sheet 36 are then mounted on the light guide panel 24, and the liquid crystal display panel 2 is then mounted on the backlight unit.

In the backlight assembling process of such an LCM, an upper and a lower peeling sheet 44, 46 (as shown in FIG. 2) are attached to the upper prism sheet 36 for protecting the upper prism sheet 36 itself and preventing the inflow of impurities from the outside before the upper prism sheet 36 is mounted.

Polyethylene, (a semitransparent material) is used for the upper and the lower peeling sheet 44, 46. In the event that the upper prism sheet 36 (to which the upper and the lower peeling sheet 44, 46 are adhered) is mounted on the lower prism sheet 34, firstly the lower peeling sheet 46 and the upper peeling sheet 44 are peeled away from the upper prism sheet 36, and then the upper prism sheet 36 is mounted on the lower prism sheet 34. A reason why the upper and the lower peeling sheet 44, 46 are removed from the upper prism sheet 36 is because the upper and the lower peeling sheet 44, 46 is of the semitransparent material. As a consequence, the screen inspection of the backlight unit (described later) cannot be carried out.

After the upper prism sheet 36 has been mounted on the lower prism sheet 34, the screen inspection of the backlight unit is carried out. The screen inspection of the backlight unit is performed because of possible inflow of impurities (causing stains), or other damage such as scratches. The backlight unit is inspected in-use, with light passing through the light guide panel 24, the diffusion sheet 32, the lower prism sheet 34 and the upper prism sheet 36 by driving the lamp 20.

After the completion of the screen inspection of the backlight unit, the LCM whereon the backlight unit is mounted, is packed to be transferred to a liquid crystal display panel assembling process. In the liquid crystal display panel assembling process, the liquid crystal display panel 2 is mounted to correspond to the top of the light guide panel 24, the diffusion sheet 32, the lower prism sheet 34 and the upper prism sheet 36 on the support main 14.

In this manner, when assembling the conventional LCM, because the upper and the lower peeling sheet 44, 46 are removed from the upper prism sheet 36 for the screen inspection of the backlight unit mounted on the support main 14, the surface of the backlight unit is exposed to the outside during the job waiting time between the assembling processes of the liquid crystal display panel 2. Due to the external exposure of the surface of the backlight unit, impurities flow in from the outside onto the surface of the backlight unit. Due to such impurities flowing into the backlight, screen staining such as white spots and black spots occur upon driving of the conventional LCM.

SUMMARY OF THE INVENTION

Accordingly, it is an object of the present invention to provide an optical sheet and a method of assembling a liquid crystal display module that is capable of preventing an inflow of impurities on a backlight unit, thereby minimizing screen staining caused by the impurities.

In order to achieve these and other objects of the invention, an optical sheet installed between a liquid crystal display panel and a light guide member according to an aspect of the present invention includes a transparent peeling sheet adhered to the front surface of the optical sheet facing the liquid crystal display panel; and a semitransparent peeling sheet adhered to the rear surface of the optical sheet facing the light guide member.

Herein, the material of the transparent peeling sheet is Polyethylene Terephthalate PET.

Herein, the material of the semitransparent peeling sheet is Polyethylene.

A method of assembling a liquid crystal module according to another aspect of the present invention includes steps of providing an optical sheet where a transparent peeling sheet and a semitransparent peeling sheet are adhered to the front surface and the rear surface thereof respectively; peeling the semitransparent peeling sheet away; having the rear surface of the optical sheet, from which the semitransparent peeling sheet is peeled away, face downward and the front surface of the optical sheet, to which the transparent peeling sheet is stuck, face upward; and irradiating light through a light guide member to the optical sheet, to which the transparent peeling sheet is adhered, so as to detect impurities contamination on the light guide member and the optical sheet.

The method further includes a step of depositing at least one or more optical sheets between the light guide member and the optical sheet to which the transparent peeling sheet is stuck, before peeling the semitransparent peeling sheet away.

The method further includes steps of peeling the transparent peeling sheet away; and depositing a liquid crystal display panel to be positioned on the front surface of the optical sheet, from which the transparent peeling sheet is peeled away.

In the described method, the material of the transparent peeling sheet is a polyester, e.g., Polyethylene Terephthalate PET.

In the described method, the material of the semitransparent peeling sheet is a polyolefin, e.g., polyethylene, polypropylene, etc.

BRIEF DESCRIPTION OF THE DRAWINGS

These and other objects of the invention will be apparent from the following detailed description of the embodiments of the present invention with reference to the accompanying drawings, in which:

FIG. 5 is a flowchart representing a method of assembling a liquid crystal module according to an embodiment of the present invention.

DETAILED DESCRIPTION OF PREFERRED EMBODIMENT

Figure 1:
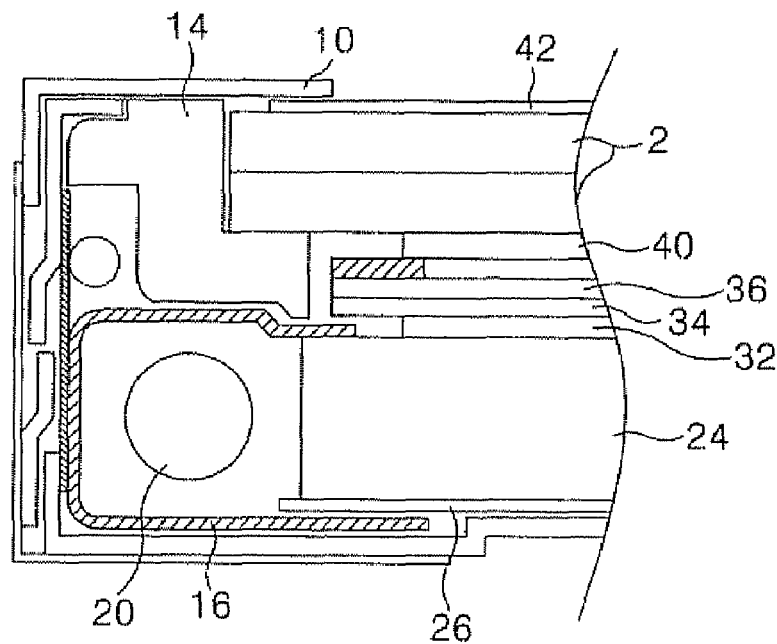
FIG. 1 is a sectional view representing a conventional liquid crystal module LCM.
Figure 2:
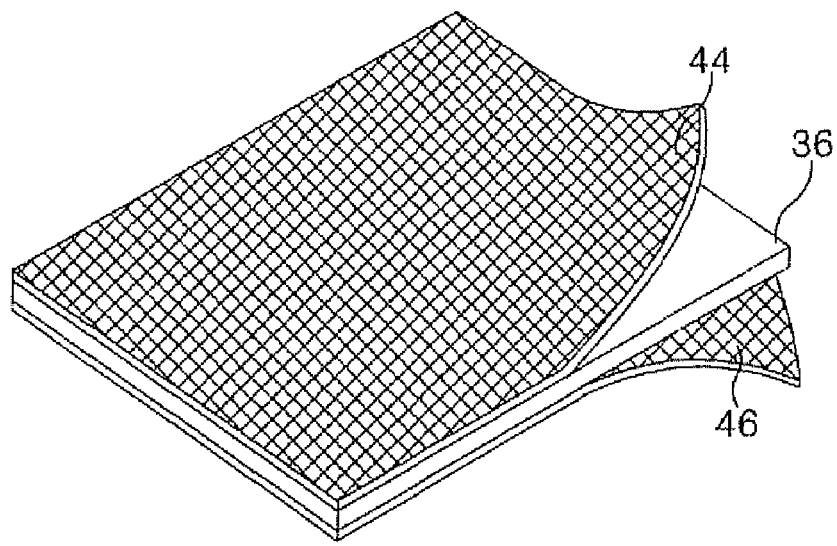
FIG. 2 is a perspective view representing an upper prism sheet to which an upper and lower prism sheet are adhered.
Figure 3:
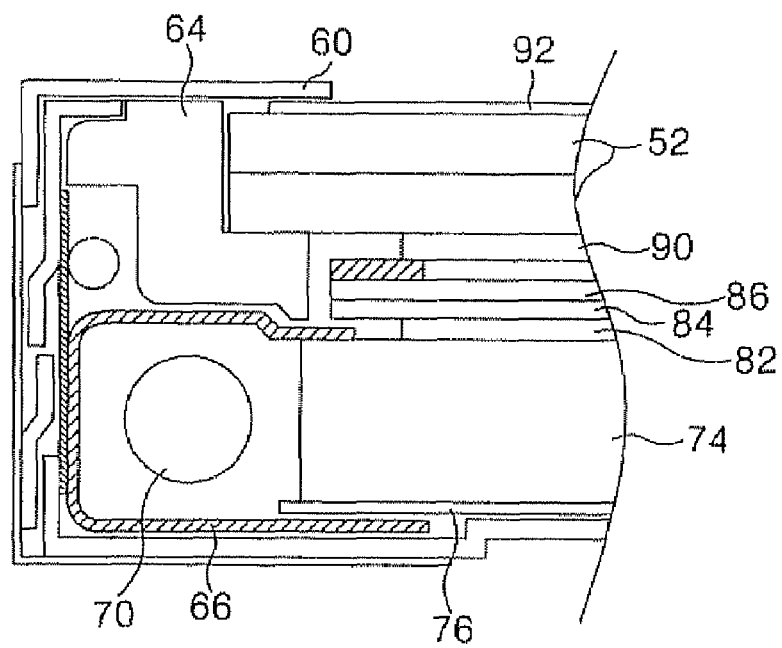
FIG. 3 is a sectional view representing a liquid crystal module according to an embodiment of the present invention.
Figure 4:
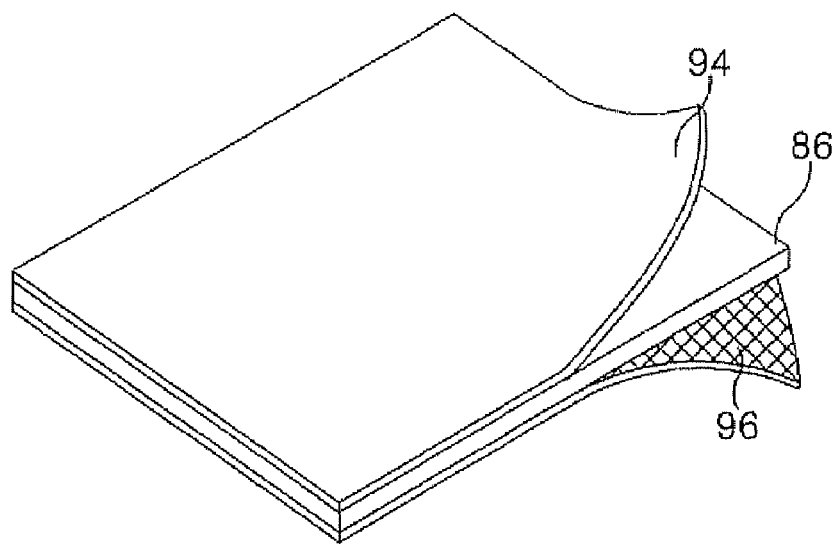
FIG. 4 is a perspective view representing an upper prism sheet to which a semitransparent peeling sheet, as shown in FIG. 3, is adhered.

With reference to FIGS. 3 to 5, a preferred embodiment of the present invention is explained as follows.

Referring to FIG. 3, a liquid crystal module LCM according to an embodiment of the present invention includes a support main 64, a liquid crystal display panel 52 deposited on the support main 64, a top case 60 covering the edge of the liquid crystal display panel 52 and the support main 64, and a backlight unit having a plurality of optical sheets 82, 84, 86 and a light guide panel 74.

In the liquid crystal display panel 52, a liquid crystal is interposed between two glass substrates to which an upper and a lower polarizing plate 92, 90 are adhered respectively, and a thin film transistor TFT drives each of liquid crystal cells arranged in matrix form type.

The top case 60 is bent at a right angle to cover the side surface of the support main 64 and the edge of the liquid crystal display panel 52. The support main 64 and the top case 60 are assembled with screws (not shown).

The support main 64 is generally made as a molding, but recently, it has been manufactured of a metal which has excellent heatproof properties against high temperature (such as aluminum Al) in correspondence to a high brightness television or a high brightness monitor. A reflecting plate 76 is located at the bottom of the support main 64, and the light guide panel 74 and the optical sheets 82, 84, 86 are deposited on top of it. The liquid crystal display panel 52 is mounted on the optical sheets 82, 84, 86 in the support main 64.

The backlight unit includes a lamp 70 for generating light, a lamp housing 66 installed in a shape so as to cover the lamp 70, a light guide panel 74 for converting the incident light from the lamp 70 to the planar light source, a reflecting plate 76 installed at the rear of the light guide plate 74, and optical sheets on which a diffusion sheet 82, a lower prism sheet 84 and an upper prism sheet 86 are sequentially deposited.

A cold cathode fluorescent lamp CCFL is mainly used as the lamp 70, and the light generated at the lamp 70 is incident to the light guide panel 74 through an incident surface located at the side surface of the light guide panel 74.

The lamp housing 66 has a reflecting surface on the inside of it to reflect the light from the lamp 70 to the incident surface of the light guide panel 74. The light guide panel 74 is manufactured such that the shape of its rear surface is inclined and its front surface is flat. The reflecting plate 76 reflects the light incident to itself through the rear surface of the light guide panel 74 to the light guide panel 74, thereby reducing the loss of light. That is, if the light from the lamp 70 is incident to the light guide panel 74, it is reflected in a tilt angle at the rear surface, being the inclined surface to progress toward the front surface uniformly. At this moment, the light progressed to the lower surface and the side surface of the light guide panel 74 is reflected at the reflecting plate 76 to progress toward the front surface. The light passing through the light guide panel 74 is diffused to an entire area by the diffusion sheet 82.

On the other hand, the light incident to the liquid crystal play panel 52 has higher light efficiency when it is incident perpendicularly. To achieve this, it is desirable to deposit two forward direction prism sheets for the progress angle of the light coming out of the light guide panel 74 to be perpendicular to the liquid crystal display panel. The light passing through the diffusion sheet 82 is incident to the liquid crystal display panel 52 via the lower and the upper prism sheet 84, 86.

At this moment, an upper and a lower peeling sheet 94, 96 (as shown in FIG. 4) are adhered to the upper prism sheet 86 for protecting the upper prism sheet 86 itself and preventing the inflow of impurities from the outside before the upper prism sheet 86 is mounted.

In the optical sheets according to the present invention, polyethylene terephthalate PET, being a transparent material is used for the upper peeling sheet 94 which is stuck to the front surface of the upper prism sheet 86. Polyethylene as a semitransparent material is used for the lower peeling sheet 96 which is (adhered) to the rear surface of the upper prism sheet 86.

In the event that the upper prism sheet 86 to which the upper and the lower peeling sheet 94, 96 are adhered is mounted on the lower prism sheet 84, only the lower peeling sheet 96 of a semitransparent material is peeled away from the upper prism sheet 86 first, and then the upper prism sheet 86 is mounted on the lower prism sheet 84. On the other hand, the upper peeling sheet 94 is peeled away from the upper prism sheet 86 just before assembling the liquid crystal display panel 52 after the completion of the screen inspection of the backlight unit (described later).

In this assembling method of the LCM, as shown in FIG. 5, the lamp housing 66, on which the lamp 70 is mounted, is mounted on the support main 64 (S1).

The reflecting plate 76 and the light guide panel 74 are sequentially mounted on the bottom surface of the support main 64 where the lamp housing 66 is mounted (S2, S3).

Then, the diffusion sheet 82 and the lower prism sheet 84 are mounted on the light guide panel 74 (S4, S5).

Subsequently, the lower peeling sheet 96 of the upper and the lower peeling sheet 94, 96 adhered to the upper prism sheet 86 only is removed, and the rear surface of the upper prism sheet 86 from which the semitransparent peeling sheet 96 is peeled away is made to face downward so that the front surface of the upper prism sheet 86 to which the transparent upper peeling sheet is adhered is made to face upward, and then the upper prism sheet 86 is mounted on the lower prism sheet 84 (S6, S7).

The screen inspection of the backlight unit is carried out when the upper prism sheet 86, from which the lower peeling sheet 96 is removed, is mounted on the lower prism sheet 84 (S8). At this moment, the screen inspection of the backlight unit takes place, wherein a light is irradiated to the upper prism sheet 86 (to which the transparent upper peeling sheet 94 is adhered) via the light guide panel 74, the diffusion sheet 82, the lower prism sheet 84, the upper prism sheet 86 and the transparent upper peeling sheet 94 by driving the lamp 70 so as to inspect for defects such as impurities inflow stains and scratches on the backlight unit.

When the screen inspection of the backlight unit is completed, the LCM wherein the backlight unit is mounted is packed to be transferred to the liquid crystal display panel assembly process. At this moment, the upper peeling sheet 94, which is adhered onto the upper prism sheet 86 of the backlight unit, is not removed. Accordingly, the inflow of the impurities from the outside onto the backlight surface is cut off during job waiting time between the upper prism sheet 86 mounting process and the liquid crystal display panel 52 mounting process by the upper peeling sheet 96.

Then, if the backlight unit (including the upper prism sheet 86) is mounted on the support main 64, the upper peeling sheet 94 is removed from the upper prism sheet 86 to mount the liquid crystal display panel 52 to be located over the upper prism sheet 86 (S9, S10).

Subsequently, the top case 60 is mounted on the support main 64 to cover the edge of the support main 64 and the liquid crystal display panel 52 (S11).

Accordingly, the assembly method of the LCM according to the present invention removes the lower peeling sheet 96 of the upper and the lower peeling sheet 94, 96 when mounting the upper prism sheet 86 on the lower prism sheet 84 which is mounted on the support main 64, and then the screen inspection of the backlight unit is carried out. The screen inspection is impossible to carry out if the upper peeling sheet is not removed from the upper prism sheet because the upper peeling sheet is made of semitransparent material in the screen inspection of the conventional backlight unit. However, in the present invention it is possible to carry out the screen inspection without removing the upper peeling sheet 94 because the upper peeling sheet 94 is made of PET, a transparent material.

On the other hand, the external impurities do not flow in to the backlight unit between the upper prism sheet 86 mounting process and the liquid crystal display panel 52 mounting process because the upper peeling sheet 94 adhered to the upper prism sheet 86 is removed from the upper prism sheet 86 when assembling the liquid crystal display panel 52.

As described above, the optical sheet and the assembling method of the liquid crystal module using the same according to the present invention first adheres the transparent peeling sheet to the upper prism sheet and then removes the transparent peeling sheet from the upper prism sheet just before assembling the liquid crystal display panel so that the external exposure time of the backlight unit is minimized to cut off the impurities inflow onto the surface of the backlight unit, thereby minimizing the screen staining caused by impurities Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. An optical sheet comprising:
   a diffusion sheet;
   a lower prism sheet on the diffusion sheet;
   an upper prism sheet on the lower prism sheet;
   a transparent peeling sheet adhered to a front surface of the upper prism sheet; and a semitransparent peeling sheet adhered to a rear surface of the diffusion sheet.

2. The optical sheet according to claim 1, wherein the material of the transparent peeling sheet is Polyethylene Terephthalate PET.

3. The optical sheet according to claim 1, wherein the material of the semitransparent peeling sheet is Polyethylene.

* * * * *